March 17, 1931.   R. W. SNYDER   1,797,181
BRAKE
Filed April 7, 1930
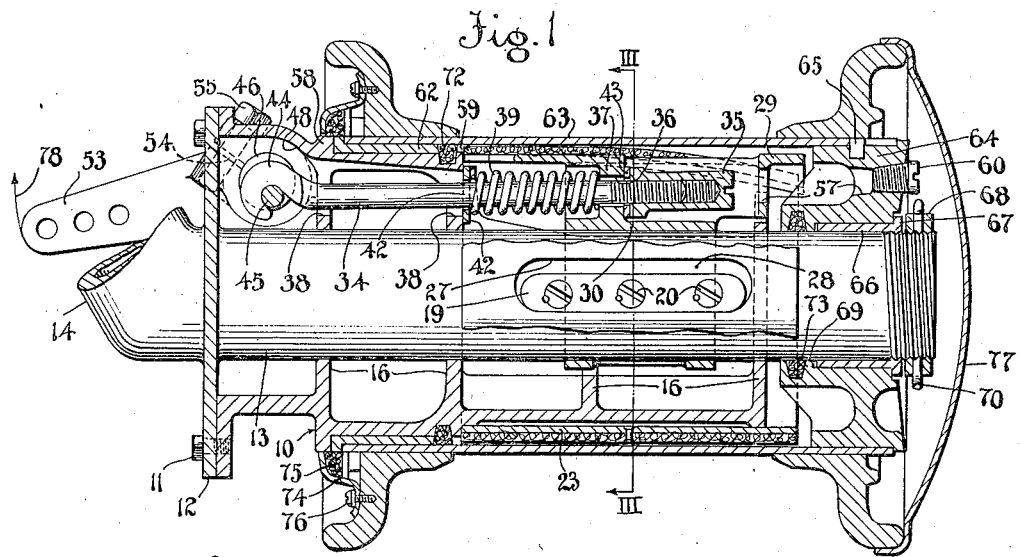
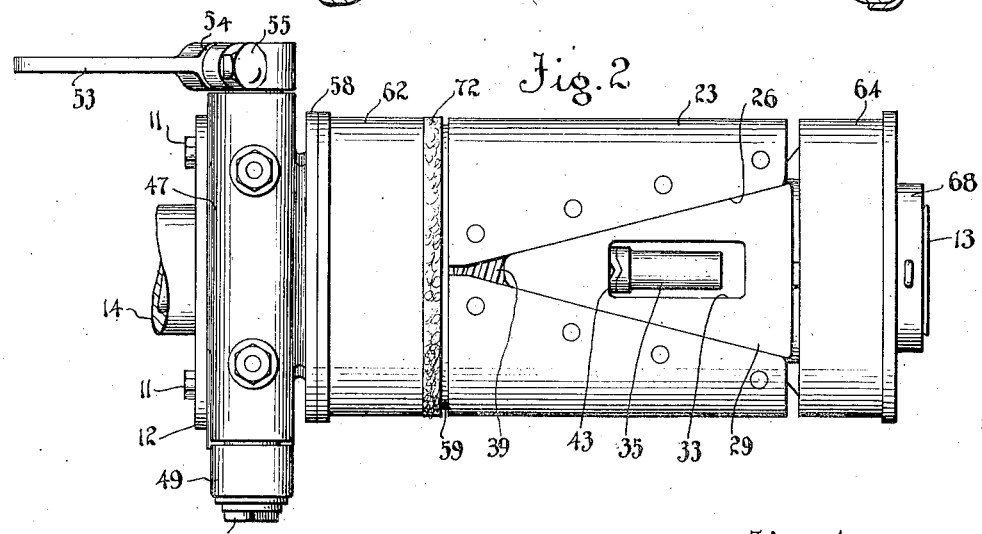
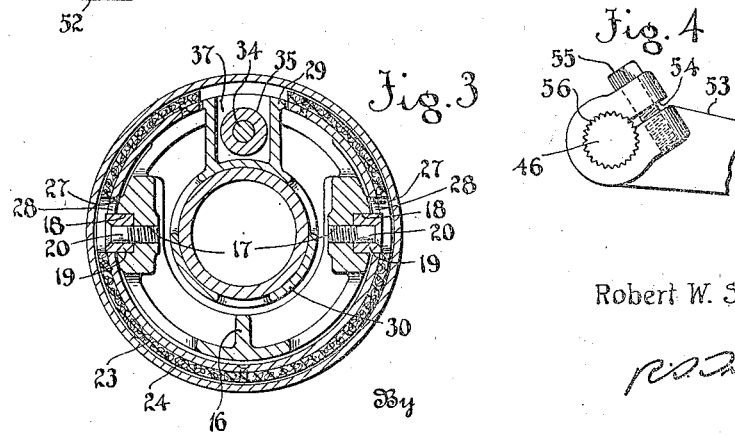
Inventor
Robert W. Snyder
By R. S. Snyder
Attorney Patented Mar. 17, 1931

1,797,181

UNITED STATES PATENT OFFICE

ROBERT W. SNYDER, OF AKRON, OHIO, ASSIGNOR TO THE GOODYEAR TIRE & RUBBER COMPANY, OF AKRON, OHIO, A CORPORATION OF OHIO

BRAKE

Application filed April 7, 1930. Serial No. 442,226.

This invention relates to brakes and it has particular relation to a type of airplane brake which is enclosed within the hub barrel of an aircraft landing gear wheel.

One object of the invention is to provide a construction of brake elements in a compact arrangement that insures efficient braking operation in both directions of rotation of the wheel.

Another object of the invention is to provide cooperating elements arranged to insure efficient braking action upon the inner surface of a hub barrel of relatively small diameter.

For a better understanding of the invention, reference may now be had to the accompanying drawings, forming a part of the specification, of which Figure 1 is a longitudinal sectional view of a brake constructed according to the invention;

Figure 2 is a plan view of a brake having its outer elements removed for the sake of clearness;

Figure 3 is a cross-sectional view taken substantially along the line III—III of Figure 1, and Figure 4 is a fragmentary, elevational view of a connection between a brake actuating arm and a crank shaft.

In practicing the invention, a brake carrier 10 is rigidly mounted, as indicated at 11, upon a flange 12 that is integral with an axle 13 of a leading gear frame 14. Reinforcing walls 16 of the carrier extending inwardly strengthen the construction and facilitate mounting the carrier upon the axle. Diametrically opposite portions of the carrier are provided with openings 17 and grooves 18 in which keys 19 that project outwardly beyond the edges of the grooves, are secured by means of screws or rivets 20. A cylindrical split sleeve 23, preferably composed of resilient metal and a suitable peripheral brake lining 24, has an opening 26 of wedge shape therein, and is provided with slots 27 into which the keys 19 are normally disposed. It will be observed that the width of the slots 27 is greater than the width of the keys 19 and that the lower edge of each key, as viewed in Fig. 3, engages the lower edge of the slot, while the difference in width between the key and slot is defined by a space 28 above each key.

A wedge 29 having an integral relatively small cylindrical portion 30 that fits slidably about the axle, is disposed within the opening 26 and is provided with a central opening 33. As best shown by Figure 1, the brake carrier 10 is sufficiently long to extend beyond the extremities of the wedge 29, and substantially incloses its cylindrical portion 30.

A rod 34 having an internally threaded nut 35 threaded upon the inner end thereof, extends through a relatively large opening 36 in an integral web 37 of the wedge and through relatively large openings 38 in the walls 16 of the carrier. A coil spring 39 disposed about the rod is normally confined under compression between the web 37 and a washer 42, disposed against one of the walls 16. Another washer 43 is disposed between the nut 35 and the web 37. At the end of the rod opposite the nut 35, a hook 44 formed thereon engages an eccentric or crank pin 45 that is integral with an intermediate portion of a crank shaft 46. Opposite end portions of the crank shaft are mounted in a cylindrical bearing housing 47 that is integral with the brake carrier and has a central hollow portion 48 for receiving the hook 44. It will be observed that the housing is arranged transversely of the axle and the brake carrier, and that the hollow portion 48 communicates with the adjacent opening 38. One end of the crank shaft is provided with a spacer 49 and conventional securing means 52, while the other end receives an actuating arm 53 that is split, as indicated at 54, and clamped thereon by tightening a bolt 55 threaded into the arm through the split portion. Cooperating serrated portions 56 prevent relative rotation of the shaft 46 and the arm 53. Thus by tightening bolt 55 the split portions of the arm are drawn tightly together about the shaft 46. By adjusting the nut 35, which is accessible through the opening 33, the proper initial relation is secured between the wedge 29, the sleeve 23 and the crank shaft 46. Also the nut 35 may be adjusted by a screw driver or similar tool that can be inserted through openings 57. A removable plug 60 is normally threaded into the outer opening 57.

Two shoulders 58 and 59 of greater and lesser diameters, respectively, are formed adjacent one end portion of the brake carrier, i. e., on the portion toward the landing gear flange 12, and a bearing bushing 62 abutting the shoulder 58 rotatably supports one end of a hub barrel 63. The other end of the hub barrel is provided with an inner annular bearing block, 64 keyed thereto, as indicated at 65, and rotatably mounted upon a bushing 66 that is mounted upon the outer end of the axle. A shoulder 67 upon the bushing maintains the hub barrel in its proper position, and a nut 68 threaded upon the end of the axle secures the bushing thereon. The inner end of the bushing also abuts a shoulder 69 of the bearing block. A detachable locking device 70 maintains the nut 68 in proper position on the end of the axle.

Felt washers 72 and 73, arranged adjacent the bushings 62 and 66. respectively, serve to facilitate lubrication of the various parts of the brake. Also, an annular shield 74 having a ring of felt 75 therein is secured to the hub barrel, as indicated at 76, and prevents the lubricant from leaking from the bearings. Another shield 77 is snapped over the outer end of the hub barrel.

By actuating the outer end of the arm 53 in the direction of the arrow 78, the wedge 29 expands the sleeve 23 into braking relation against the inner cylindrical surface of hub barrel, while the keys 19 lock the sleeve 23 with respect to the brake carrier and axle. As soon as the arm is released, the spring 39 operates to retract the wedge and to permit the sleeve to contract under the influence of its inherent resiliency. The brake operates equally efficiently without regard to the direction of relative rotation between the hub barrel and the braking sleeve. Also, the sleeve 23, about approximately three-fourths of its circumference, is self-energizing, i. e., as soon as it is expanded into braking relation with the inner surface of the hub barrel, the portion of the sleeve extending from the opening 26 and including one of the key slots 27 to the other key slot, tends to expand increasingly under the influence of the frictional force applied thereto, together with the locking action of the key 19 in the second key slot. Either the one or the other key 19 alone serves as a lock during actuation of the brake, depending upon the direction of rotation of the hub barrel 63 with respect to the axle 13.

Although only the preferred form of the invention has been disclosed and described in detail, it will be apparent to those skilled in the art that the invention is not so limited but that various modifications may be made therein without departing from the spirit of the invention or from the scope of the appended claims.

What I claim is:

1. A brake comprising a hollow member having an axle rigidly supporting it, a hub barrel rotatably supported by the hollow member and the axle, a split sleeve having means in the split for expanding it, said means having an integral portion slidably supported upon the axle within the hub barrel, and a lever mechanism on the hollow member having connections to the means for expanding the sleeve.

2. A brake comprising a hollow member having an axle rigidly supporting it, a hub barrel rotatably supported upon hollow member, a split sleeve having means in the split for expanding it, said means having an integral portion slidably surrounding the axle within the hollow member, a bearing housing formed integrally on the hollow member, an actuating device rotatably mounted in the bearing about an axis transversely of the axis of the axle, and means for connecting the actuating device to the first-mentioned means.

3. A brake comprising a hollow member having an axle rigidly supporting it, a hub barrel rotatably supported upon the hollow member and axle, a slotted sleeve including wedging sections, one of said sections having an integral portion slidably surrounding the axle within the hollow member, a key projecting laterally from an intermediate portion of the hollow member to engage the slotted portion of the sleeve, and a lever mechanism on the hollow member having connections to one of the sections for expanding the sleeve.

4. A brake comprising a hollow member having an axle rigidly supporting it, a hub barrel rotatably supported by the hollow member and the axle, a sleeve having substantially diametrically disposed openings therein, said sleeve including wedging sections, keys connected at substantially diametrically disposed portions of the hollow member for locking the latter and the sleeve against relative rotation, and a lever mechanism on the hollow member having connections to one of the wedging sections for expanding the sleeve.

5. A brake comprising a substantially annular brake carrier having an axle rigidly supporting it, a hub barrel having one end rotatably supported upon one end portion of the brake carrier, its other end being supported upon the axle adjacent the other end of the brake carrier, a sleeve having substantially diametrically disposed keyways therein, said sleeve including wedging sections, keys connected at substantially diametrically disposed portions of the brake carrier, said keyways being substantially wider than the keys, one of said keys serving as a lock against relative rotation of the sleeve and brake carrier in one direction, the other key serving as a lock against relative rotation of the sleeve and brake carrier in the other direction, and a lever mechanism on the brake carrier having connections to one of the wedging sections for expanding the sleeve.

In witness whereof, I have hereunto signed my name.

Signed at Akron, in the county of Summit and State of Ohio, U. S. A., this 1st day of April, 1930.

ROBERT W. SNYDER.